US012145366B2

(12) United States Patent
Sherman et al.

(10) Patent No.: US 12,145,366 B2
(45) Date of Patent: Nov. 19, 2024

(54) BINARY ARRAY INKJET PRINTHEAD

(71) Applicant: VIDEOJET TECHNOLOGIES INC., Wood Dale, IL (US)

(72) Inventors: Nigel Sherman, Edmunds (GB); David Horsnell, Cambridgeshire (GB); Robert Smith, Thrapston (GB); David Doswell, Somersham (GB); Steven Harris, Wooton (GB)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 17/575,013

(22) Filed: Jan. 13, 2022

(65) Prior Publication Data

US 2022/0212468 A1 Jul. 7, 2022

Related U.S. Application Data

(63) Continuation of application No. 15/115,568, filed as application No. PCT/US2015/022453 on Mar. 25, 2015, now Pat. No. 11,254,130.

(Continued)

(51) Int. Cl.

*B41J 2/14* (2006.01)
*B41J 2/025* (2006.01)

(Continued)

(52) U.S. Cl.

CPC ............. *B41J 2/1433* (2013.01); *B41J 2/025* (2013.01); *B41J 2/085* (2013.01); *B41J 2/09* (2013.01);

(Continued)

(58) Field of Classification Search

None

See application file for complete search history.

(56) References Cited

U.S. PATENT DOCUMENTS 4,346,389 A 8/1982 Nagayama
5,457,484 A 10/1995 Regnault et al.

(Continued)

FOREIGN PATENT DOCUMENTS

CN 1042234 A 5/1990
CN 1048913 A 1/1991

(Continued)

OTHER PUBLICATIONS

International Search Report and Written Opinion for PCT/US2015/022453; Oct. 5, 2015; 14 pages.

*Primary Examiner* — Alejandro Valencia

(74) *Attorney, Agent, or Firm* — DeLizio, Peacock, Lewin & Guerra LLP

(57) ABSTRACT

A binary array ink jet printhead assembly includes a cavity for containing ink, nozzle orifices in fluid communication with the cavity for passing the ink from the cavity to form droplets, the nozzle orifices extending along a length of the cavity, and an electrode assembly. The electrode assembly includes a front face configured to be disposed generally parallel to a plurality of droplet paths of droplets from the nozzle orifices. A plurality of charge electrodes are disposed on the front face, each charge electrode corresponding to a droplet path and disposed parallel to the droplet path. Circuitry is disposed on the electrode assembly, wherein each electrode is electrically connected to the circuitry. The circuitry is further in electrical connection to a connector for connecting the electrode assembly to a controller for the printhead.

23 Claims, 10 Drawing Sheets

Related U.S. Application Data

(60) Provisional application No. 61/972,524, filed on Mar. 31, 2014.

(51) Int. Cl.

| | |
|---|---|
| ***B41J 2/085*** | (2006.01) |
| ***B41J 2/09*** | (2006.01) |
| ***B41J 2/095*** | (2006.01) |

(52) U.S. Cl.

CPC ...... *B41J 2/095* (2013.01); *B41J 2002/14491* (2013.01)

(56) References Cited

U.S. PATENT DOCUMENTS

| | | | | |
|---|---|---|---|---|
| 6,305,786 | B1 | 10/2001 | Plotkin et al. | |
| 6,527,379 | B1 * | 3/2003 | Martin | B41J 2/08 347/73 |
| 8,517,491 | B2 | 8/2013 | Netsu | |
| 2003/0071874 | A1 * | 4/2003 | Ishizawa | B41J 2/17509 347/49 |
| 2005/0110836 | A1 | 5/2005 | Colombat et al. | |
| 2005/0185031 | A1 | 8/2005 | Steiner et al. | |
| 2007/0064066 | A1 | 3/2007 | Piatt et al. | |
| 2007/0064068 | A1 | 3/2007 | Piatt et al. | |
| 2010/0085401 | A1 | 4/2010 | Murad et al. | |
| 2011/0193908 | A1 * | 8/2011 | Araszkiewiez | B41J 2/125 347/14 |
| 2013/0120507 | A1 | 5/2013 | Omer et al. | |
| 2016/0332449 | A1 * | 11/2016 | Pourtier | B41J 2/185 |

FOREIGN PATENT DOCUMENTS

| | | | |
|---|---|---|---|
| CN | 201362033 | Y | 12/2009 |
| EP | 0531156 | A2 | 3/1993 |
| EP | 0668167 | A2 | 8/1995 |
| WO | 1989005567 | A | 12/1989 |
| WO | 2003080346 | A | 10/2003 |
| WO | 20090049130 | A1 | 4/2009 |

* cited by examiner

BINARY ARRAY INKJET PRINTHEAD

BACKGROUND

The present disclosure relates to an electrode assembly for a continuous stream ink jet printhead, particularly for a binary array printhead.

Continuous ink jet (CIJ) is a form of ink jet that operates on the theory of selectively charging and deflecting drops in flight. Drops are continuously generated at the nozzle by inducing break-off from a pressurized continuous stream of ink in the presence of a variable electrostatic field created by a charging electrode that places a discrete charge on selected drops. Drops subsequently pass through an electrostatic field wherein the field potential induces deflection on the charged drops in order to direct them to print or direct them into an ink catcher to be reused in the ink system. This same mechanism is often used in binary array CIJ printing which is a type of inkjet that includes an array of jets and that can print at relatively high resolutions of at least 128 by 128 dots per inch (dpi).

Binary array printheads use actuators to vibrate ink and eject droplets thereof from the printhead. The actuators need to be precisely situated for the printhead to work properly. Binary array printheads also use a charge electrode assembly to charge droplets that are meant to be printed and not charge droplets that are to be collected in a gutter. A problem with prior charge electrode assemblies is that, because the printhead driver electronics are located far from the charge electrodes, given the number of electrodes, they require large number of electrical connections between the printhead drivers and the charge electrode assembly, which is bulky and cumbersome.

BRIEF SUMMARY

The present disclosure provides a charge electrode assembly for a binary array inkjet printhead. The charge electrode assembly includes a compact design with electrode electronics disposed behind the face of the charge electrode. The disclosed design provides smaller interconnect path than previous designs and eliminates the need for a bulky flexible connection between a printhead or print module and the rest of the printer. It provides a more compact electrode assembly and movement of the electronics closer to the jet array.

In one aspect, a binary array ink jet printhead includes a cavity for containing ink, nozzle orifices in fluid communication with the cavity for passing the ink from the cavity to form droplets, the nozzle orifices extending along a length of the cavity, and an electrode assembly. The electrode assembly includes a front face configured to be disposed generally parallel to a plurality of droplet paths of droplets from the nozzle orifices. A plurality of charge electrodes are disposed on the front face, each charge electrode corresponding to a droplet path and disposed parallel to the droplet path. At least one sensor electrode is disposed on the front face and oriented perpendicular to the droplet paths. Circuitry is disposed on a back portion of the electrode assembly opposite from the front face, wherein each electrode is electrically connected to the circuitry. The circuitry is further in electrical connection to a connector for connecting the electrode assembly to a controller for the printhead.

In another aspect, a method of operating a print assembly includes ejecting ink droplets from the nozzle orifices, generating drive signals for the plurality of charge electrodes in circuitry disposed in the print module, using the charge electrodes to charge drops not to be printed, not charging drops used for printing, collecting unprinted drops in a gutter, and printing an image on a substrate with the uncharged drops.

In another aspect, a print assembly for a binary array printer includes a printhead. The printhead includes a controller, a plurality of fluid connectors providing fluid communication to fluid sources, and at least one electrical connector in electrical communication with the controller. A print module is configured for releasable connection to the printhead, the print module including at least one electrical connector for connection to the at least one electrical connector of the printhead, a plurality of fluid connectors for connection to the plurality of fluid connectors of the print module, an actuator assembly, a charge electrode assembly disposed adjacent the actuator assembly for charging droplets ejected from the actuator assembly, a deflection electrode assembly for deflecting charged droplets, and a gutter for collecting charged droplets. The print module is easily removable from the printhead in a single step.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1B:
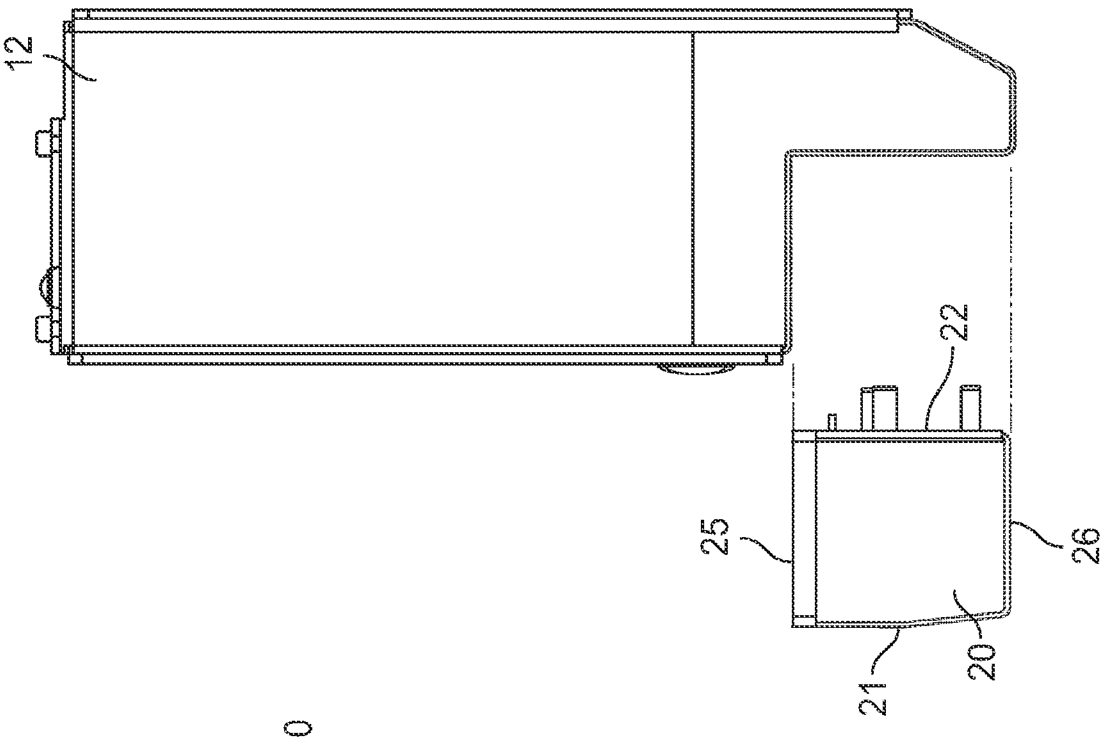
FIG. 1B is a side view of the printhead assembly of FIG. 1 with the print module detached.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

In one aspect, the present disclosure provides a charge electrode assembly for a binary array ink jet printhead. The charge electrode assembly includes a compact design with electrode electronics disposed behind the face of the charge electrode. The disclosed design provides a smaller interconnect path than previous designs and eliminates the need for a bulky flexible connection between a printhead or print module and the rest of the printer. The design provides a more compact electrode assembly and movement of the electronics closer to the jet array.

Existing binary array designs create the drive signals for driving the electrodes remote from the charge electrode assembly, and thus require an approximately 300 mm long flexible circuit between the driver circuitry and the charge electrode ceramic block, where a further 20 mm of exposed tracking (separated by <100 um) leads to the active charge pad. As a result, capacitive coupling introduces up to 10% cross-talk on adjacent channels. The disclosed design positions the driver circuitry in the print module very close to the charge electrodes; this configuration reduces the total length between the driver circuitry and the charge electrodes to a few millimeters, thus greatly reducing this cross-talk and reduces capacitive coupling from track to track.

The disclosed design also moves the serial to parallel signal conversion closer to the jet array. Prior systems with 256 jets require at least 256 electrical interconnects between the printhead electronics and the sub assembly containing the jet array. The present design reduces the number of electrical interconnects below 100 for 512 jets and enables quick disconnection of the print module from the system, leading to a modular design of printhead and print module. Consequently the user experience is improved as the print module can be replaced in a manner similar to that found in desk top style printers.

The disclosed design also provides a significant reduction in footprint for the electronics. Prior art designs require two driver electronics printed circuit boards (PCB's), each with an approximate area 100 mm×80 mm. The disclosed design integrates the same functionality into the charge electrode tile having area of 130 mm×21 mm.

Figure 1A:
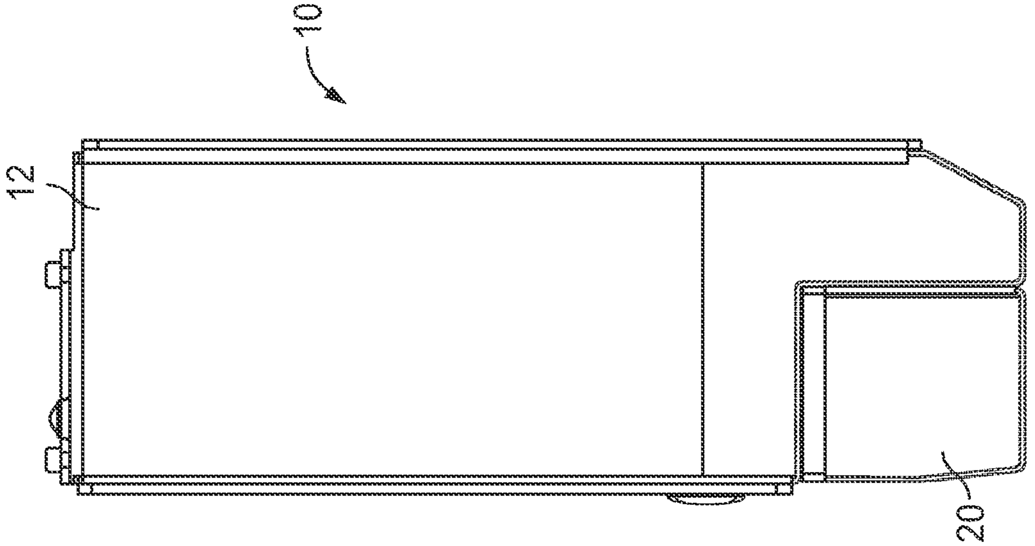
FIG. 1A is a side view of a printhead assembly.

FIG. 1A is a side view of a printhead assembly 10. The printhead assembly 10 includes a printhead 12 and a removable print module 20. Print module 20 is releasably connectable to the printhead 12. The printhead 12 may include such components as a controller printed circuit board, fluid and electrical connections, pressure, vacuum and ink temperature sensors, and other electronics. The controller (not shown) may be any conventional controller known in the art and will generally include a CPU and memory. The controller is in electrical communication with the print module through the electrical connections described below. The print module 20 includes components such as the actuator assembly, charge electrode, deflection electrode, gutter, and related components. In one embodiment, the print module 20 includes all the structures in the printhead assembly 10 for ejecting ink, and the printhead 12 itself does not include any such structures like the actuator assembly, charge electrode, deflection electrode, and gutter. Because all the ink ejection features are in the print module itself, there is no issue of difficulties in alignment of different structures to each other during replacement of the module, such as the nozzles and the charge electrodes, since they are pre-aligned in the module. The print module 20 (disclosed further below) is designed to be easily detachable from the printhead 12. FIG. 1B is a side view of the printhead assembly of FIG. 1 with the print module 20 detached. The print module 20 is connected to the printhead by a variety of fluid and electronic connections, which will be described in more detail below.

Figure 2:
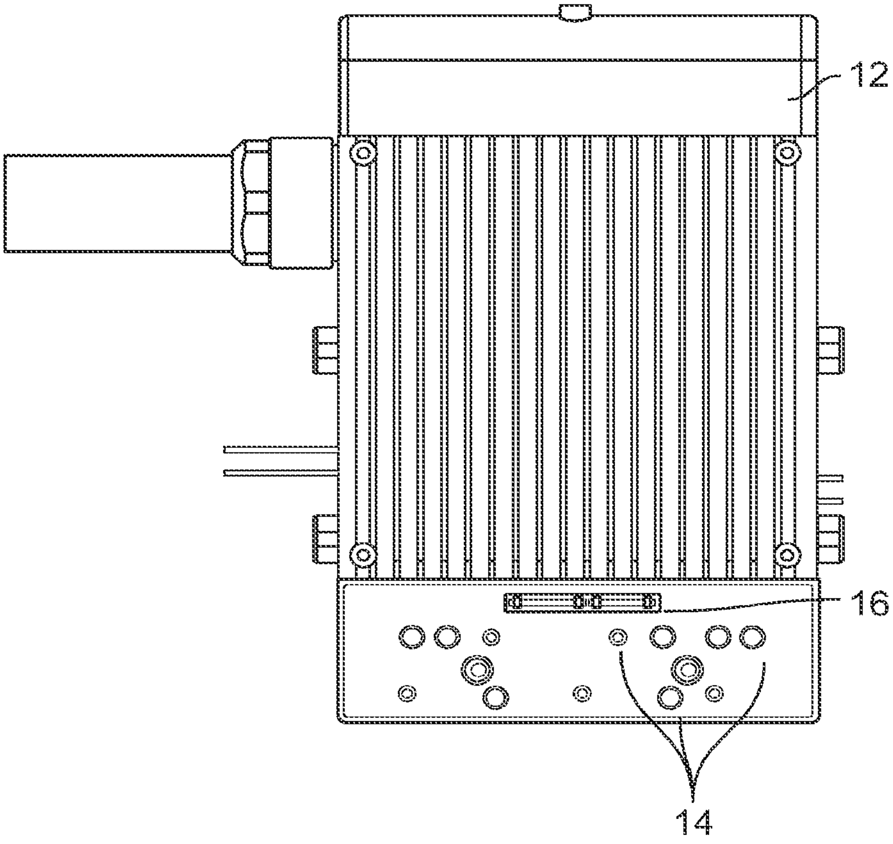
FIG. 2 is a view of the printhead with the print module removed.
Figure 3:
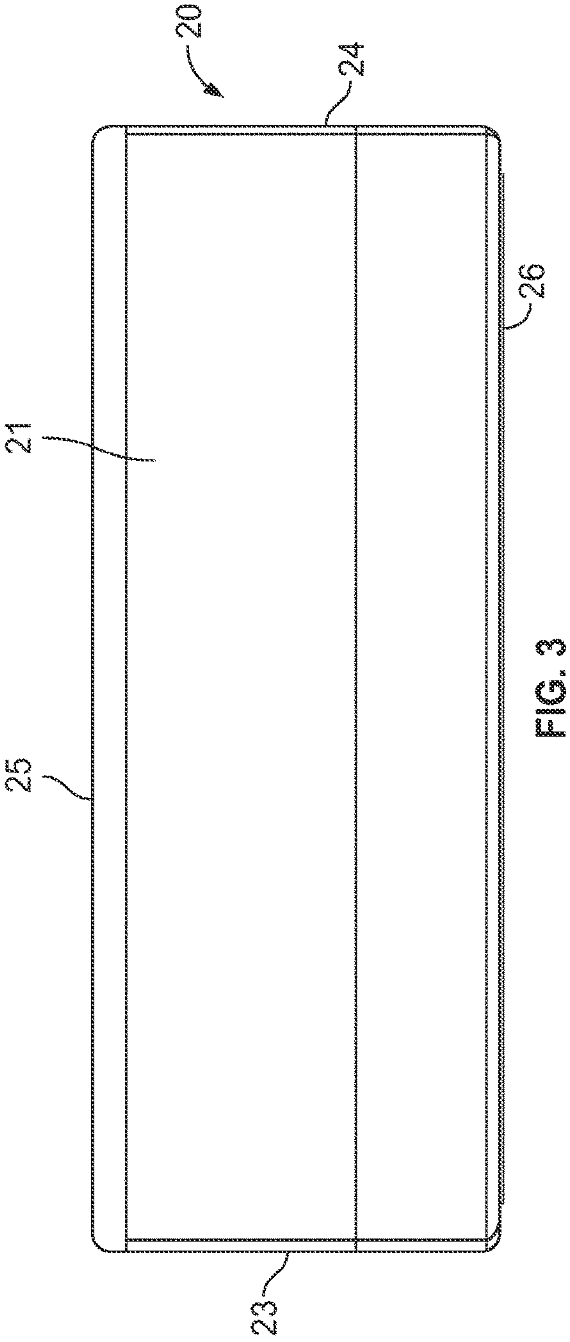
FIG. 3 is a front view of a print module.
Figure 4:
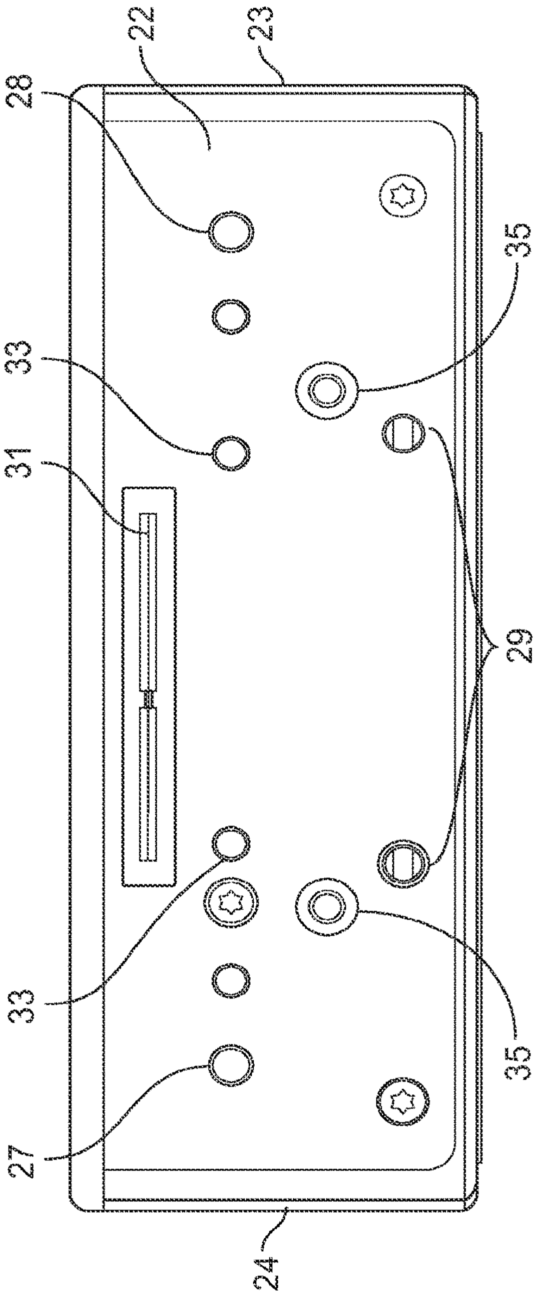
FIG. 4 is a rear view of the print module of FIG. 3.
Figure 5:
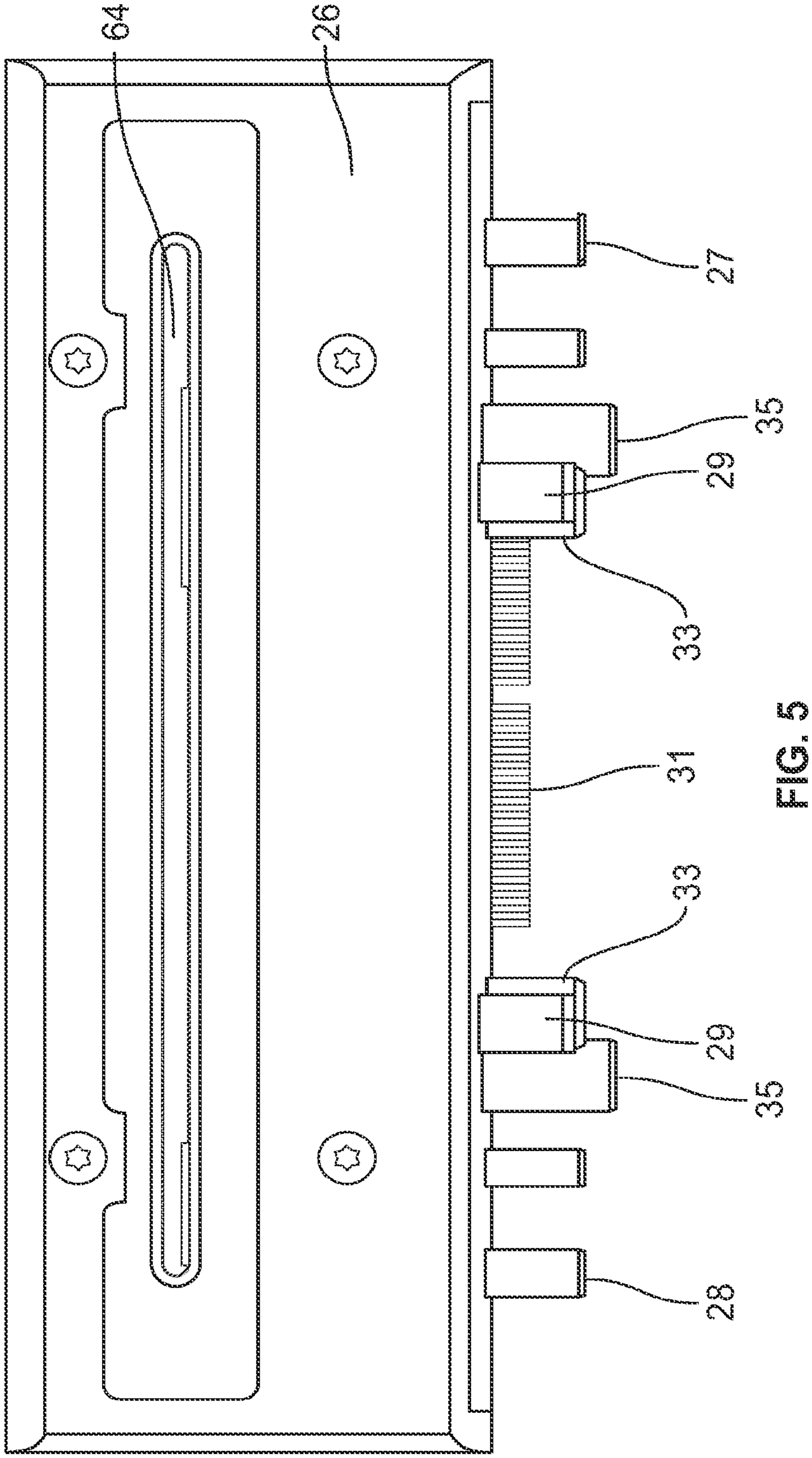
FIG. 5 is a bottom view of the print module of FIG. 3.

FIG. 2 is a view of the printhead with the print module detached. FIG. 3 is a front view of the print module 20. FIG. 4 is a rear view of the print module 20. FIG. 5 is a bottom view of the print module 20. The print module 20 may be in the general shape of a rectangular solid. In one embodiment, the print module 20 is about 5 inches wide, 2 inches high, and 2 inches deep. The print module 20 includes a front wall 21, back wall 22, side walls 23, 24, top wall 25, and bottom wall 26. Extending from back wall 22 are various connectors, including electrical connector 31, mechanical connectors 35, and various fluid connectors which may include ink feed 27, ink purge 28, gutter lines 29, and cleaning channels 33. Printhead 12 includes complementary connectors for connecting the electrical and fluid connections of the print module to the printhead. For example, if the print module includes extending spigots for fluid transfer, the printhead will include openings 14 for accommodating the spigots and providing a secure fluid connection thereto. Likewise, printhead 12 will provide an electrical connector 16 for connecting to print module connector 31. It will be apparent that other electrical, fluid, and mechanical connections are possible. These connections allow the print module 20 to be quickly and easily removed from the printhead 12. In particular, the electrical and fluid connections between the print module 20 and the printhead 12 can be disconnected in a single step. In one embodiment, all of the electrical and fluid connections between the print module 20 and the printhead 12 are provided on a single face of the print module. This configuration helps provide an easy connection, without the need for any difficult alignment. Ink is ejected from the bottom wall 26 of the print module; in particular, from slot 64 disposed on the bottom wall 26 of the print module.

Figure 6:
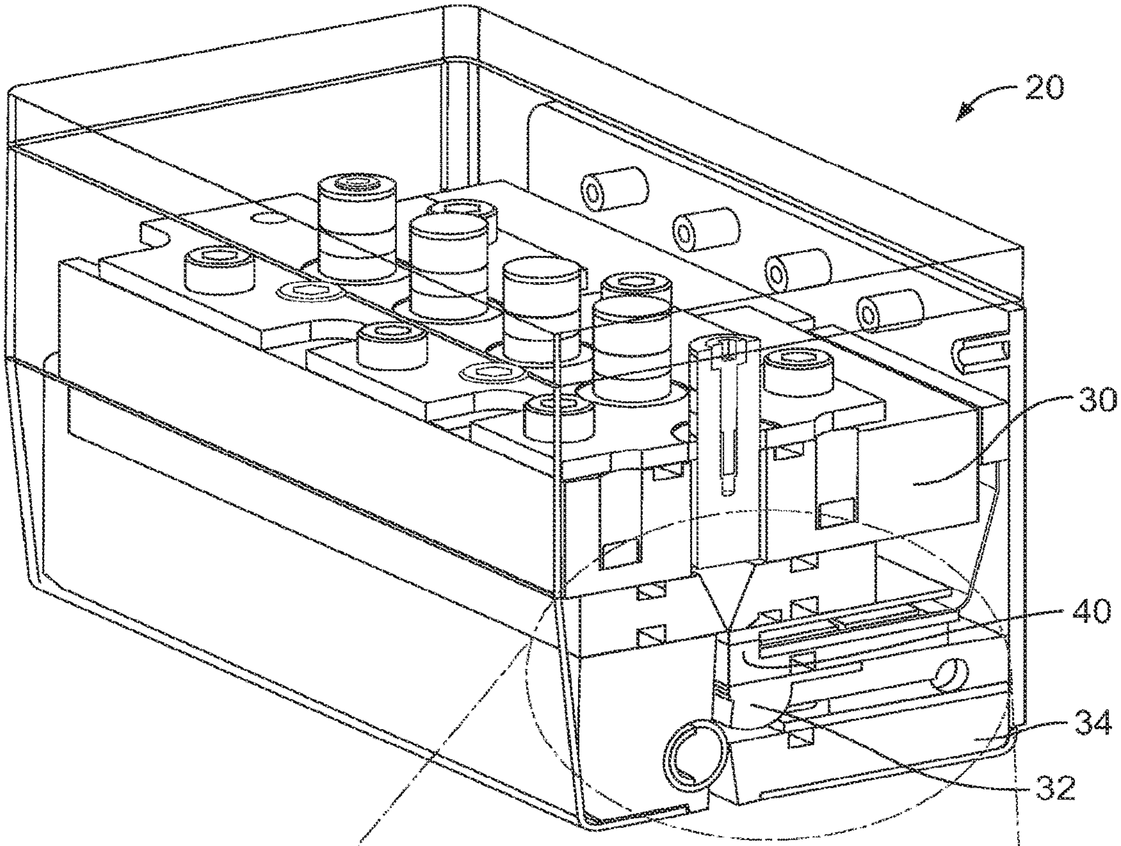
FIG. 6 is a sectional view of an embodiment of the print module of FIG. 3 with the outer cover transparent.
Figure 6A:
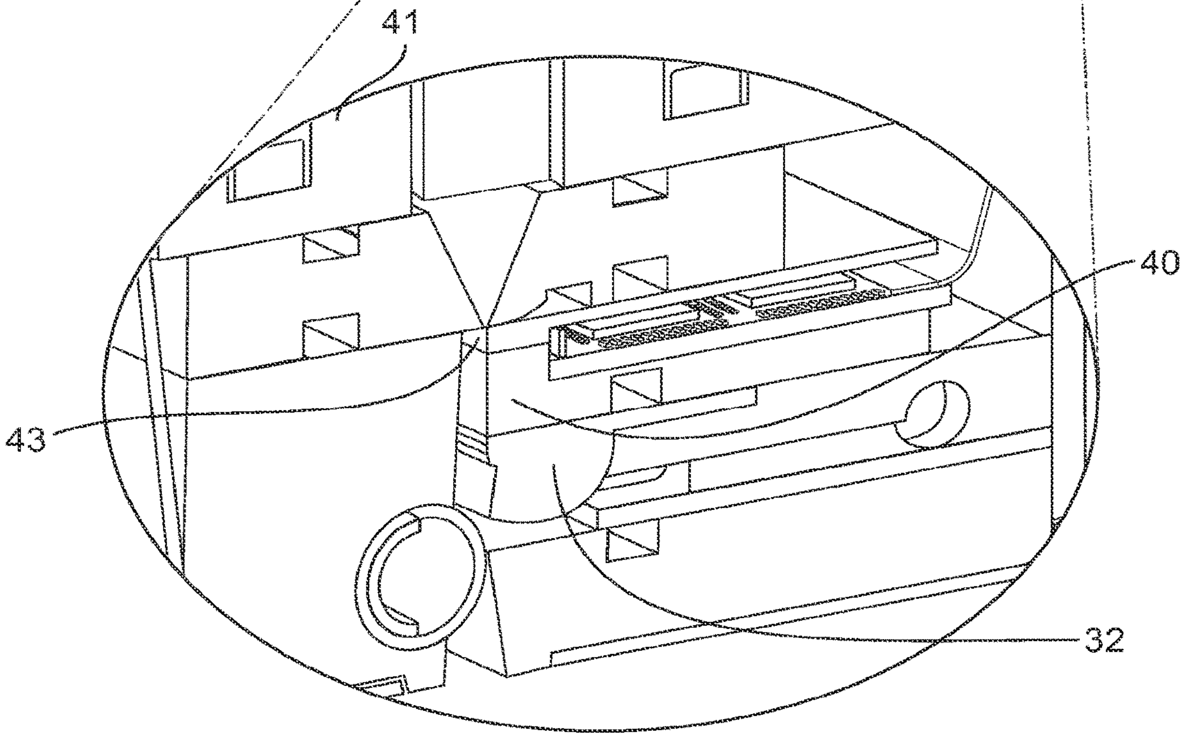
FIG. 6A is an enlarged view of a portion of FIG. 6

FIG. 6 is a sectional view of an embodiment of a print module 20, with the cover shown as transparent for clarity of view. The technology used in the printhead and print module 20 is known as a binary array printhead. In binary array printing, an array of jets is ejected and modulated to produce droplets, wherein each droplet is either printed or recycled by a gutter, based on the image being printed. FIG. 6A is an enlarged view of a portion of FIG. 6 showing the components in more detail. The print module 20 includes a droplet generator 30, charging electrode and deflection electrode assembly 40, and gutter 32. The gutter 32 is disposed "downstream" of the charging electrode and deflection electrode assembly 40. Ink droplets are ejected from orifices 43. Droplets to be printed are not charged, while non-printed droplets are charged. The charged droplets are deflected by the electric field generated by the deflection electrode and collected by the gutter 32. The print module 20 includes a cavity 41 for containing ink (particularly organic solvent-based ink) and an array of nozzle orifices 43 in fluid communication with the cavity for passing the ink from the cavity to form droplets, the nozzle orifices extending along a length of the cavity. The droplet generator may be of the design disclosed in PCT publication WO2015031485A1, assigned to the same applicant of the present application, Videojet Technologies Inc., the contents of which are incorporated by reference herein.

Figure 7:
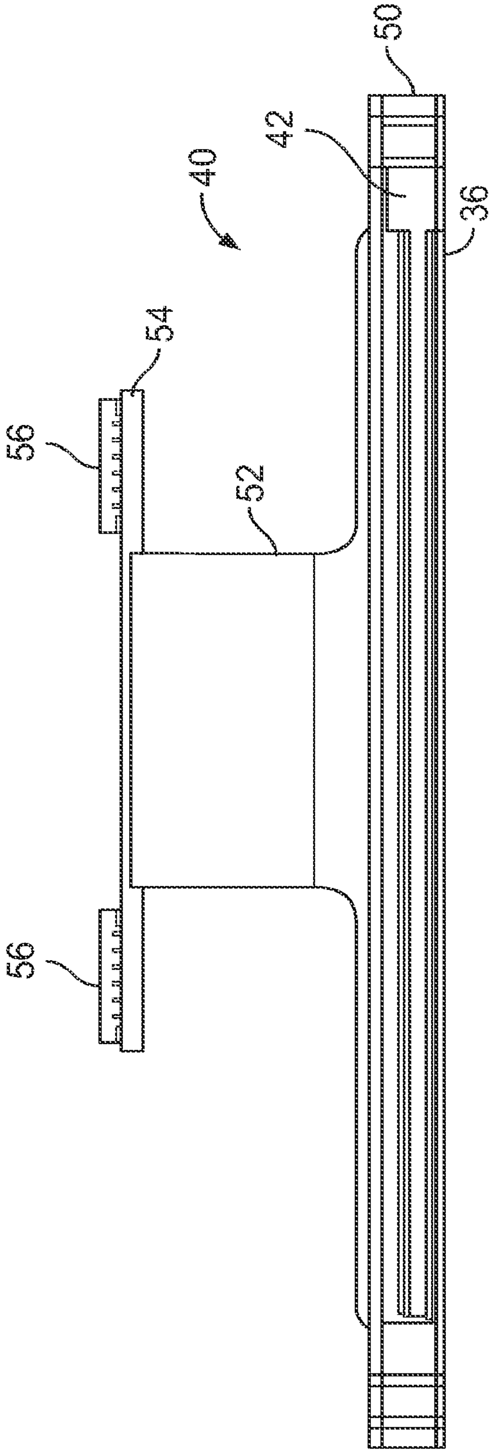
FIG. 7 is a front view of an embodiment of a charge electrode.
Figure 8:
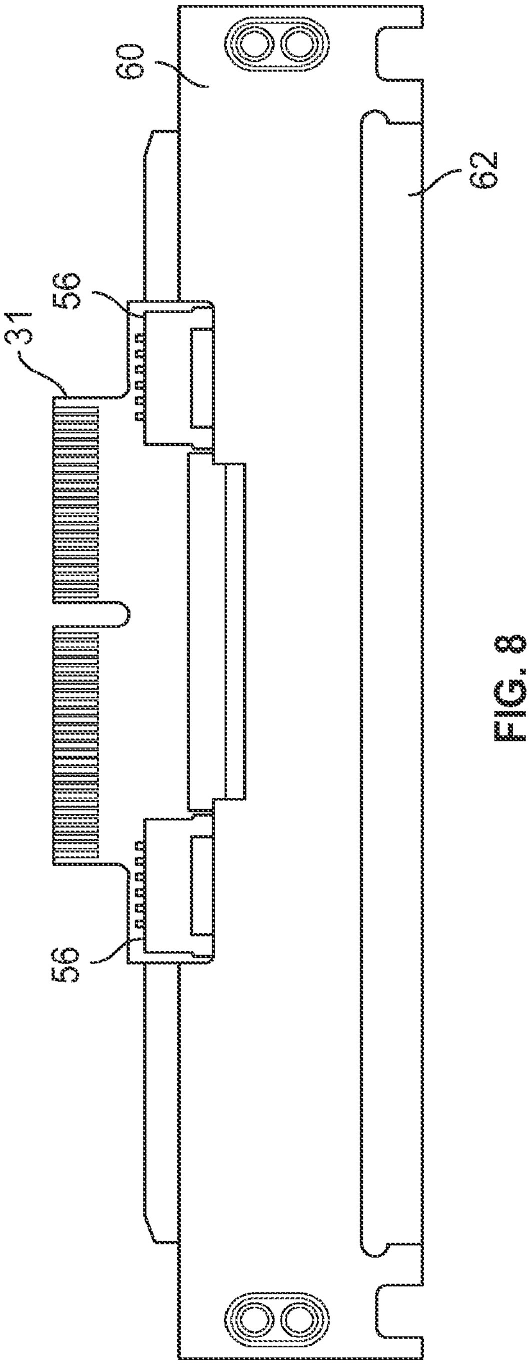
FIG. 8 is a top view of the charge electrode of FIG. 7.
Figure 7A:
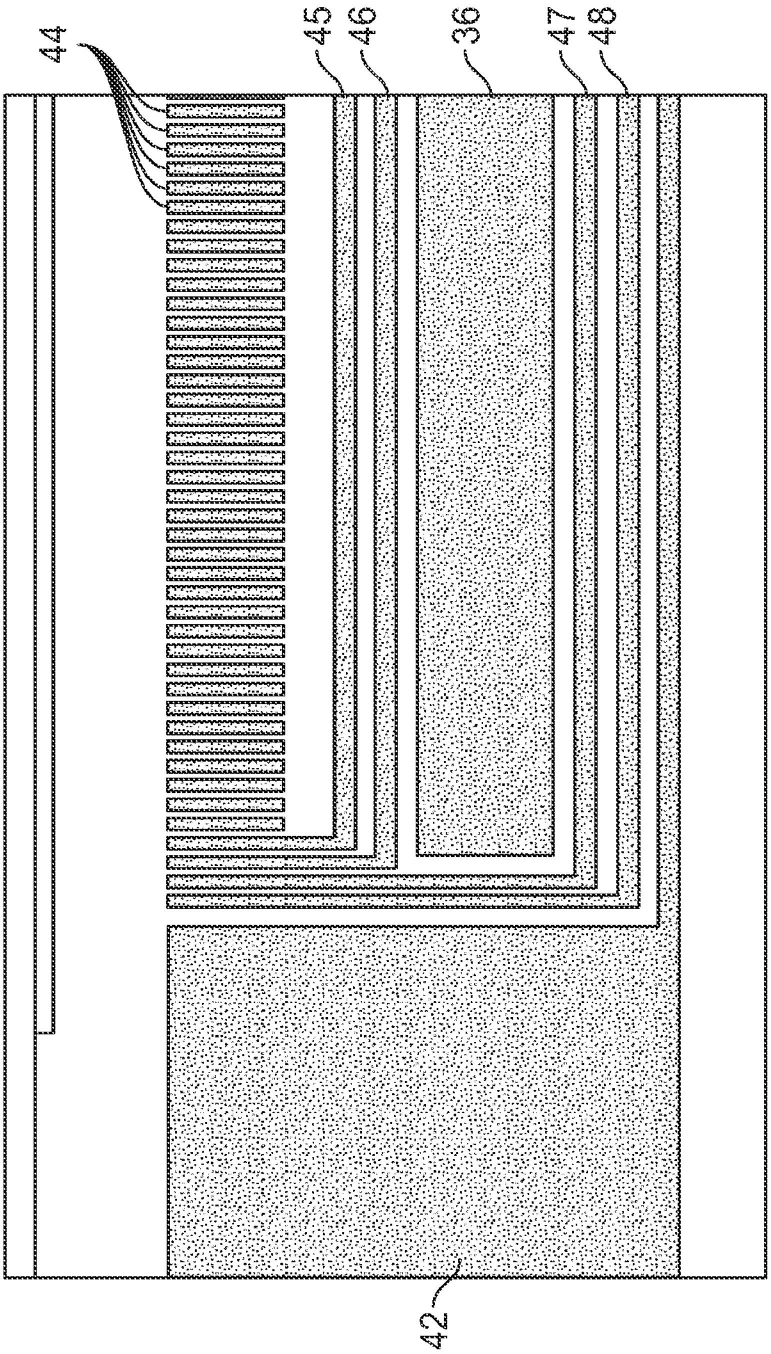
FIG. 7A is an enlarged view of a portion of FIG. 7

FIG. 7 is a front view of an embodiment of a charge electrode. FIG. 8 is a top view of the charge electrode of FIG. 7. The electrode assembly 40 includes a front face 42 configured to be disposed generally parallel to a plurality of droplet paths of droplets from the nozzle orifices. Thus, the face 42 of the electrode assembly is disposed along the width of the array of nozzle orifices 43. As best seen in FIG. 7A, a plurality of charge electrodes or tracks 44 are disposed on the front face 42. The electrodes include conductive material disposed on and between insulating materials such as ceramic. The electrode tracks are each about 100 micron to 200 micron wide, preferably between 100 and 150 micron wide, most preferably about 135 micron wide. Each charge electrode 44 corresponds to a droplet path from the nozzle array and is oriented generally parallel to the droplet path. The charge electrodes may be generally flat, or may include grooves like the designs shown in U.S. Pat. No. 5,561,452, the contents of which are incorporated by reference. The front face 42 further includes one or more sensor electrodes disposed on the front face 42 and oriented generally perpendicular to the droplet paths. As shown in FIG. 7A, in one embodiment the electrode assembly includes four sensor electrodes 45, 46, 47, 48, and deflection electrode 36 disposed laterally across the droplet paths. Sensors 45, 46, 47, 48 may be used to measure the phase and/or velocity of the droplets. The electrode assembly may include at least two sensors for detecting velocity and/or phase of the droplets. In one embodiment, the deflection electrode 36 is disposed between pairs of the sensor electrodes, with sensor electrodes 45, 46 disposed upstream of the deflection electrode 36 and sensors 47, 48 disposed downstream of deflection electrode 36.

Figure 9:
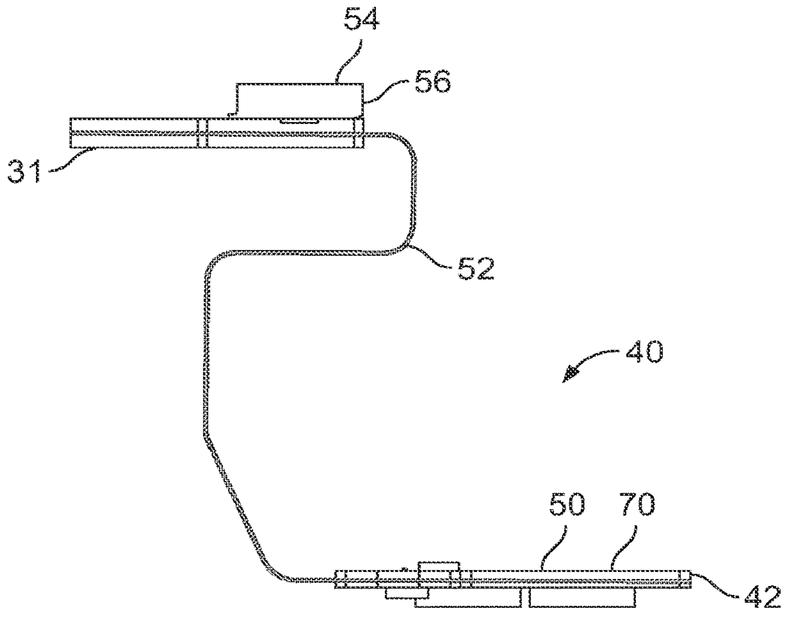
FIG. 9 is a side view of the charge electrode of FIG. 7 with the ceramic carrier removed.

FIG. 9 is a side view of the charge electrode of FIG. 7 and associated components. It can be seen that the charge electrode assembly 40 includes a generally planar charge electrode block portion 50 disposed between the droplet generator 30 and the gutter 32, circuitry 70 disposed on block portion 50, a flexible connector circuit 52, and a portion 54 including connector 31 and modulation signal connectors 56. Of course, other configurations are possible. Block portion 50 includes insulator plate 60 and cleaning fluid channel 62 on the top portion, as best seen in FIG. 8. Thus, in one embodiment, the driver circuits are disposed in the print module 20 on the block portion 50 near the charge electrode assembly 40, and not remote from the charge electrode assembly, as disclosed in the prior art.

Figure 10:
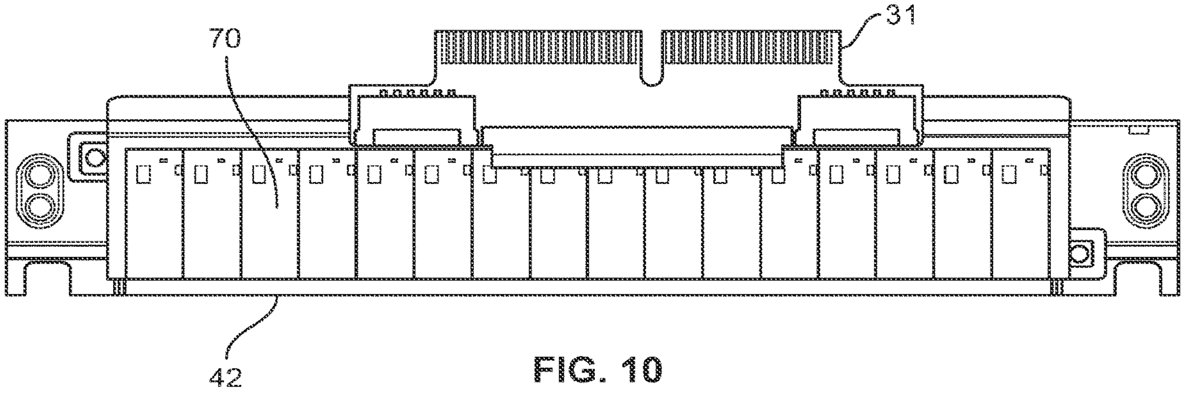
FIG. 10 shows the charge electrode of FIG. 8 with most of the ceramic carrier transparent to show the embedded electronics.

FIG. 10 shows the charge electrode of FIG. 8 with most of the ceramic carrier removed to show the embedded electronics. As shown in FIG. 10, circuitry 70 is disposed on a planar portion of the electrode assembly behind the front face 42. In prior art designs, the circuitry for the charge electrode is disposed remote from the charge electrode rather than adjacent to it. Circuitry 70 is preferably disposed within 10 mm of the charge electrode assembly. In one embodiment, circuitry 70 is disposed less than 20 mm, less than 15 mm, less than 10 mm, or less than 5 mm from the charge electrode assembly. Circuitry 70 generally includes a PCB with integrated circuits and discrete components. The circuitry provides the drive signals to apply drop charging pulses to the electrodes 44, at the correct timing relative to the drop generation clock. In essence, the circuitry 70 provides the switches to determine which electrode 44 is to be charged at a given time. The circuitry 70 also provides a conversion between the serial connection of connector 31 to a parallel connection. Thus, in one embodiment, the conversion between a serial to a parallel connection occurs less than 20 mm, less than 15 mm, less than 10 mm, or less than 5 mm from the charge electrode assembly. Each electrode 44, 45, 46, 47, 48, is electrically connected to the circuitry 70. The circuitry 70 is further in electrical connection to connector 31 for further connecting the electrode assembly 40 to a controller for the printhead. Connector 31 may be an appropriate connector, such as a card edge serial connector.

The connector 31 for connecting the electrode assembly 40 to a controller for the printhead includes electrical connections for providing print data, power, sensors, ground, and modulation signals. In one embodiment, the connector and the circuitry comprise less than 100 separate electrical connections or channels to provide for 512 charge electrodes. Thus, the number of distinct electrical connections in connector 31 is less than the number of charge electrodes. In one embodiment, the number of distinct electrical connections between the print module and the printhead is less than 50%, less than 40%, less than 25%, or less than 20% of the number of charge electrodes.

In one embodiment, the plurality of charge electrodes 44 includes at least 256 charge electrodes. In another embodiment, the plurality of charge electrodes 44 includes at least 512 charge electrodes. Disposed over 4 inches of the electrode, 512 charge electrodes provides 128 dpi printing resolution. In further embodiments, the printhead includes less than 256 electrodes and/or prints at less than 128 dpi, such as between 80 and 100 dpi.

The print module 20 is easily replaceable in the field, such as if the module wears out, malfunctions, needs to be cleaned, or otherwise needs to be replaced. The print module 20 is easily disconnected from the printhead 12 in a single step. In addition to the fluid and electrical connections, the module is mechanically connected to the printhead by one or more posts 35. In one embodiment, these post features have threaded bores that accept screws which are captive in the printhead. The screws are tightened to secure the module 20 and undone to release the module 20 from the printhead 12. Once the screws are released, the module 20 can be removed and replaced by hand in a single motion, since all the connections are on a single face.

The electrodes in the charge electrode assembly 40 may be manufactured by any suitable method. In one embodiment, a conductive material is disposed on an insulating substrate and laser trimming is used to remove the metallic layer to provide the desired electrode tracks. In a more specific embodiment, three sputter coated layers of titanium, platinum, and gold are applied to create the conductive coating, then laser ablation is used to selectively remove and create the tracks.

The disclosed electrode and printhead design are especially suitable for printing graphic images. A feature of the printhead is that it is capable of printing on high speed substrates and is very reliable. In particular, in one embodiment the binary array printer can print on a substrate travelling 2000 feet/min and provides at least 99% uptime. By uptime is meant that the printer is available for printing at least 99% of the time, the other 1% or less being required maintenance, such as cleaning, parts replacement, and the like. Higher uptime results from a robust design that does not include many unplanned operational failures. In one embodiment the binary array printer can print on a substrate travelling at least 1000 feet/min, 1500 feet/min, or 2000 feet/min. In one embodiment the binary array printer provides at least 96%, at least 98%, at least 99%, or at least 99.5% uptime.

Figure 11:
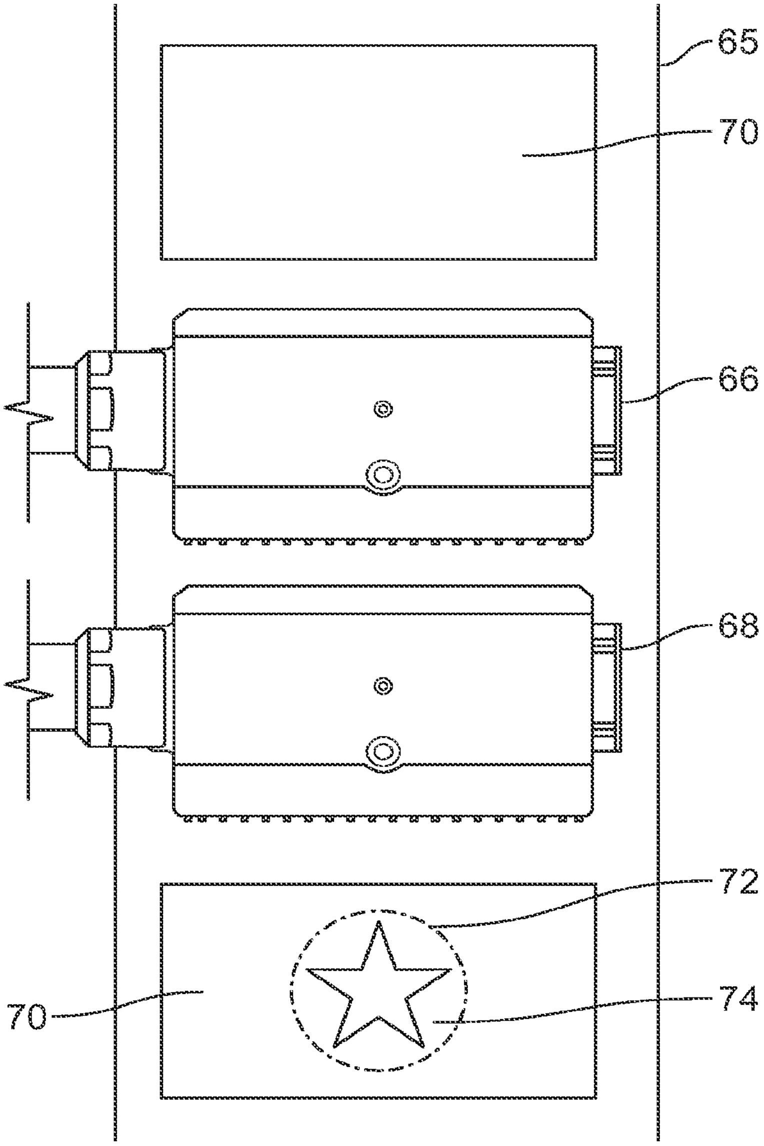
FIG. 11 is a top view showing two printheads disposed in a serial configuration.

The disclosed design includes the option of using multiple print modules in series or parallel. For example, by putting print modules and/or printheads in series, multiple colors can be printed. By putting modules in parallel, an image of greater width can be printed. FIG. 11 shows printheads disposed in series on a production line 65. The printheads are controlled by a common controller. First printhead 66 prints an image in a first color, while second printhead 68 prints an image in a second color. As shown, substrate 70 includes a first image 72 of a circle in one color (printed by printhead 66), encircling a second image 74 of a star in a second color (printed by printhead 68). It will be apparent that any number of different colors can be printed using this method.

Figure 12:
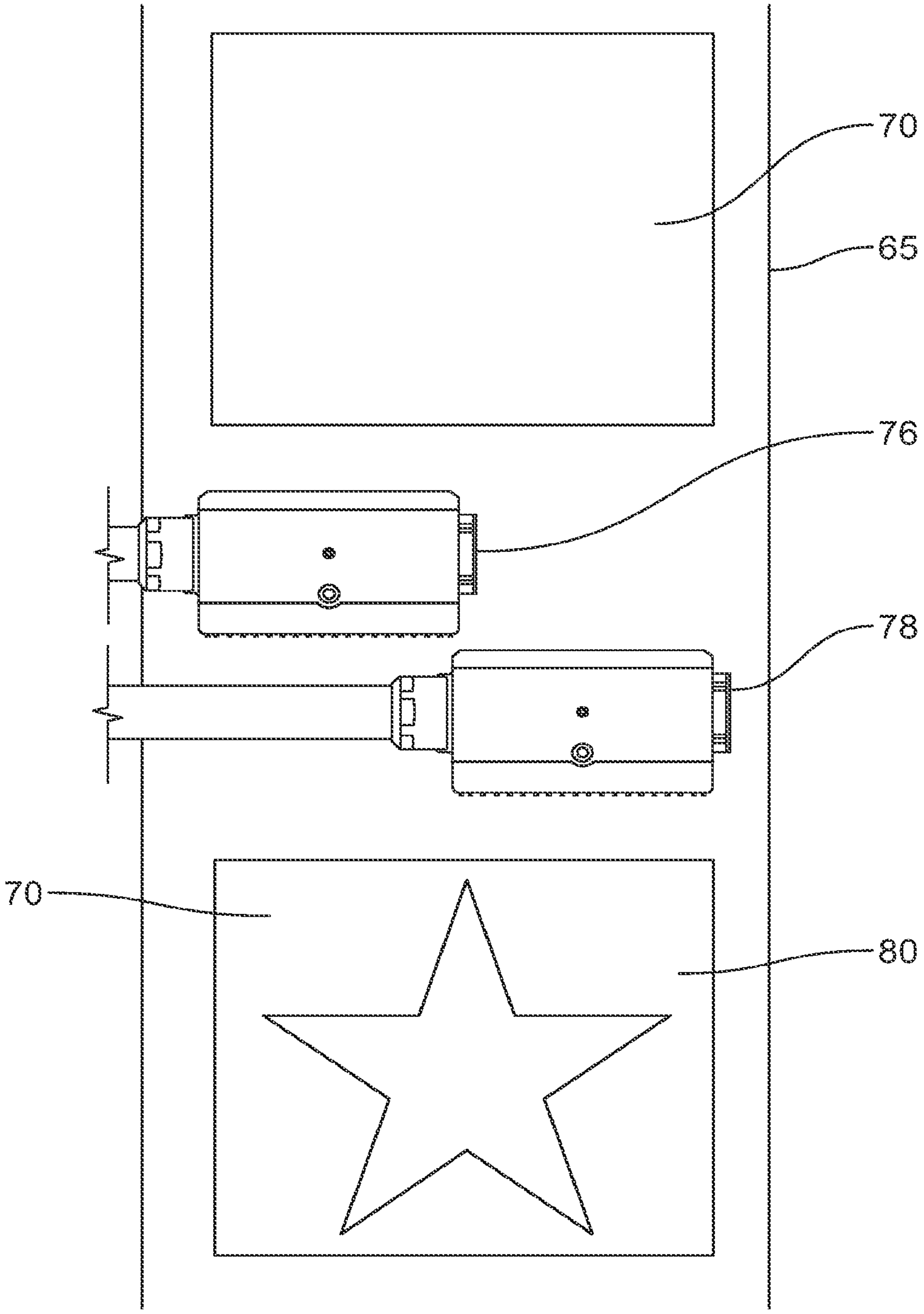
FIG. 12 is a top view showing two printheads disposed in a parallel configuration.

FIG. 12 shows printheads disposed in parallel. This arrangement allows images of a wider width to be printed. The printheads are controlled by a common controller. First printhead 76 prints a first portion of the image 80 (such as the left side) on one part of the substrate 70, and second printhead 78 prints a second portion of the image 80 (such as the right side) on a second part of the substrate 70. Thus, if an individual printhead is capable of printing an image 4 inches wide, two printheads disposed in parallel can print an image 8 inches wide. The printheads 76, 78 are controlled to provide a single image 80 with no visible seams between the two component images.

The system is particularly useful for printing with organic solvent-based inks, such as those using acetone, methyl ethyl ketone, and ethanol. The ink is supplied to the printhead assembly 10 and contained within the print module in ink cavity 41. Thus, the components of the printhead assembly that are in contact with the ink are resistant to organic solvents. The system is suitable for printing inks containing an organic solvent selected from $C_1$-$C_4$ alcohols, $C_3$-$C_6$ ketones, $C_3$-$C_6$ esters, $C_4$-$C_8$ ethers, and mixtures thereof, in an amount 50% or more by weight of the ink composition. Organic solvents that are contemplated for use with the printing system include ketones, especially methyl-ethyl ketone, acetone, and cyclohexanone; alcohols, especially ethanol; esters; ethers; polar aprotic solvents, and combinations thereof. Examples of $C_1$-$C_4$ alcohols include methanol, ethanol, 1-propanol, and 2-propanol. Examples of $C_3$-$C_6$ ketones include acetone, methyl ethyl ketone, methyl n-propyl ketone, and cyclohexanone. Examples of $C_4$-$C_8$ ethers include diethyl ether, dipropyl ether, dibutyl ether and tetrahydrofuran. Examples of $C_3$-$C_6$ esters include methyl acetate, ethyl acetate and n-butyl acetate.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A print assembly for a continuous stream ink jet printer comprising:

- a printhead, the printhead comprising:
  - a plurality of fluid connectors providing fluid communication to fluid sources, wherein the plurality of fluid connectors comprise an ink feed connector, an ink purge connector, a gutter line connector, and a cleaning channel connector; and
  - at least one electrical connector for the printhead that comprises electrical connections for providing print data, power, sensors, ground, and modulation signals; and
- a print module configured for releasable connection to the printhead, the print module comprising:
  - at least one electrical connector for the print module that comprises a number of electrical connections for connection to the at least one electrical connector of the printhead;
  - a plurality of fluid connectors, wherein the plurality of fluid connectors comprise an ink feed connector, an ink purge connector, a gutter line connector, and a cleaning channel connector, for connection to the plurality of fluid connectors of the printhead;
  - a droplet generator;
  - an actuator assembly;
  - a charge electrode assembly, comprising a plurality of charge electrodes, disposed adjacent the actuator assembly for charging droplets ejected from the actuator assembly, wherein the number of electrical connections is less that the number of charge electrodes, and the at least one electrical connector that comprises the number of electrical connections is configured to connect the charge electrode assembly to a controller for the printhead;
  - a deflection electrode assembly for deflecting charged droplets;
  - a plurality of sensor electrodes to measure the phase and/or velocity of the droplets; and
  - a gutter for collecting unprinted droplets;
- wherein the plurality of fluid connectors and the at least one electrical connector on the printhead are complementary connectors for connecting the plurality of fluid connectors and the at least one electrical connector on the print module to the printhead respectively such that the print module is easily removable from the printhead in a single step, and wherein the at least one electrical connector and the plurality of fluid connectors are provided on a single face of the print module, and
- wherein each of the number of change electrodes are positioned on the single face of the charge electrode assembly, wherein a driver circuitry is positioned on a back portion of the charge electrode assembly behind the single face of the change electrode assembly, wherein the driver circuitry is configured to generate drive signals to control the number of charge electrodes based on a control signal from the controller and via the number of electrical connections.

2. A print assembly according to claim 1, wherein the plurality of fluid connectors are configured to engage with complementary connectors in the printhead.

3. A print assembly according to claim 1, wherein the print module comprises a plurality of mechanical connectors for mechanically connecting the print module to the printhead.

4. A print assembly according to claim 3, wherein the at least one electrical connector, the plurality of fluid connectors and the plurality of mechanical connectors are provided on a single face of the print module.

5. A print assembly according to claim 3, wherein the print module includes a front wall, a back wall, two side walls, a top wall and a bottom wall; and

- wherein the plurality of fluid connectors, the at least one electrical connector and the plurality of mechanical connectors are arranged on the back wall.

6. A print assembly according to claim 1, wherein a wall of the print module comprises a slot for ejecting ink.

7. A system comprising:

- a print assembly according to claim 1;
- a fluid source; and
- a fluid line, wherein the fluid line is connected to the fluid source and the print assembly and is configured to provide fluid communication between the fluid source and the print assembly.

8. A print assembly according to claim 2, wherein the plurality of fluid connectors comprise a spigot.

9. A print assembly according to claim 2, wherein the complementary connectors comprise a spigot.

10. A print module according to claim 3, wherein the plurality of mechanical connectors comprise a post.

11. A print assembly according to claim 1, wherein there is no flexible connection between the printhead and the print module.

12. A print assembly according to claim 1, wherein the print module is in the general shape of a rectangular solid.

13. A print assembly according to claim 1, wherein the printhead further comprises a controller.

14. A print assembly according to claim 13, wherein the controller is in electrical communication with the print module through the at least one electrical connector.

15. A print assembly according to claim 1, wherein the droplet generator and the charge electrodes are pre-aligned in the print module.

16. A print assembly according to claim 1, wherein the printhead does not comprise an actuator assembly, a charge electrode, a deflection electrode, and a gutter.

17. A print assembly according to claim 1, wherein the print module includes a cavity for containing ink.

18. A print assembly according to claim 1, wherein the gutter is downstream of the charge electrode assembly and the deflection electrode assembly.

19. A print assembly according to claim 10, wherein the posts have threaded bores that accept screws.

20. A print assembly according to claim 1, wherein the number of electrical connectors is less than 50% of the number of charge electrodes.

21. A print assembly according to claim 1, wherein a distance between the driver circuitry and the number of charge electrodes is less than 10 millimeters.

22. A print assembly according to claim 1, wherein a distance between the driver circuitry and the number of charge electrodes is less than 5 millimeters.

23. A print assembly according to claim 1, wherein a distance between the driver circuitry and the number of charge electrodes is less than 20 millimeters.

* * * * *